United States Patent [19]
Warner et al.

[11] Patent Number: 5,957,036
[45] Date of Patent: Sep. 28, 1999

[54] COFFEE MAKER WITH A PAUSE-SERVE MECHANISM

[75] Inventors: Dean C. Warner, Glen Allen, Va.; Allen P. Yi, Fort Collins, Colo.

[73] Assignee: Hamilton Beach/Proctor-Silex, Inc., Glen Allen, Va.

[21] Appl. No.: 09/173,930

[22] Filed: Oct. 16, 1998

[51] Int. Cl.[6] .................................................. A47J 31/24
[52] U.S. Cl. .................................. 99/299; 99/306; 99/279
[58] Field of Search ........................... 99/299, 295, 304, 99/305, 306, 307, 279; 426/433

[56] References Cited

U.S. PATENT DOCUMENTS

| | | | |
|---|---|---|---|
| 4,467,707 | 8/1984 | Amiot | 99/279 |
| 4,667,587 | 5/1987 | Wunder | 99/295 |
| 4,790,240 | 12/1988 | Henn et al. | 99/282 |
| 4,811,657 | 3/1989 | Rixen | 99/295 |
| 4,843,955 | 7/1989 | Henn et al. | 99/295 |
| 4,893,552 | 1/1990 | Wunder et al. | 99/299 |
| 5,063,837 | 11/1991 | Precht | 99/295 |
| 5,102,546 | 4/1992 | Salomon | 210/469 |
| 5,133,247 | 7/1992 | Pastrick | 99/295 |
| 5,687,636 | 11/1997 | Diore et al. | 99/285 |

FOREIGN PATENT DOCUMENTS 0 019 291  11/1980  European Pat. Off. .

*Primary Examiner*—Reginald L. Alexander
*Attorney, Agent, or Firm*—Roger S. Dybvig

[57] ABSTRACT

A spring-biased valve lever on the bottom of a coffee maker brew basket is pivoted to open the brewed liquid outlet of the brew basket in response to the rotation of a valve actuator caused by the placement of a carafe on the warmer plate of the coffee maker. The valve actuator is mounted for rotation about a vertical axis and has two horizontally movable arms, one which is engaged by the carafe and one which engages and presses downwardly on the rearward end of the valve lever.

8 Claims, 4 Drawing Sheets

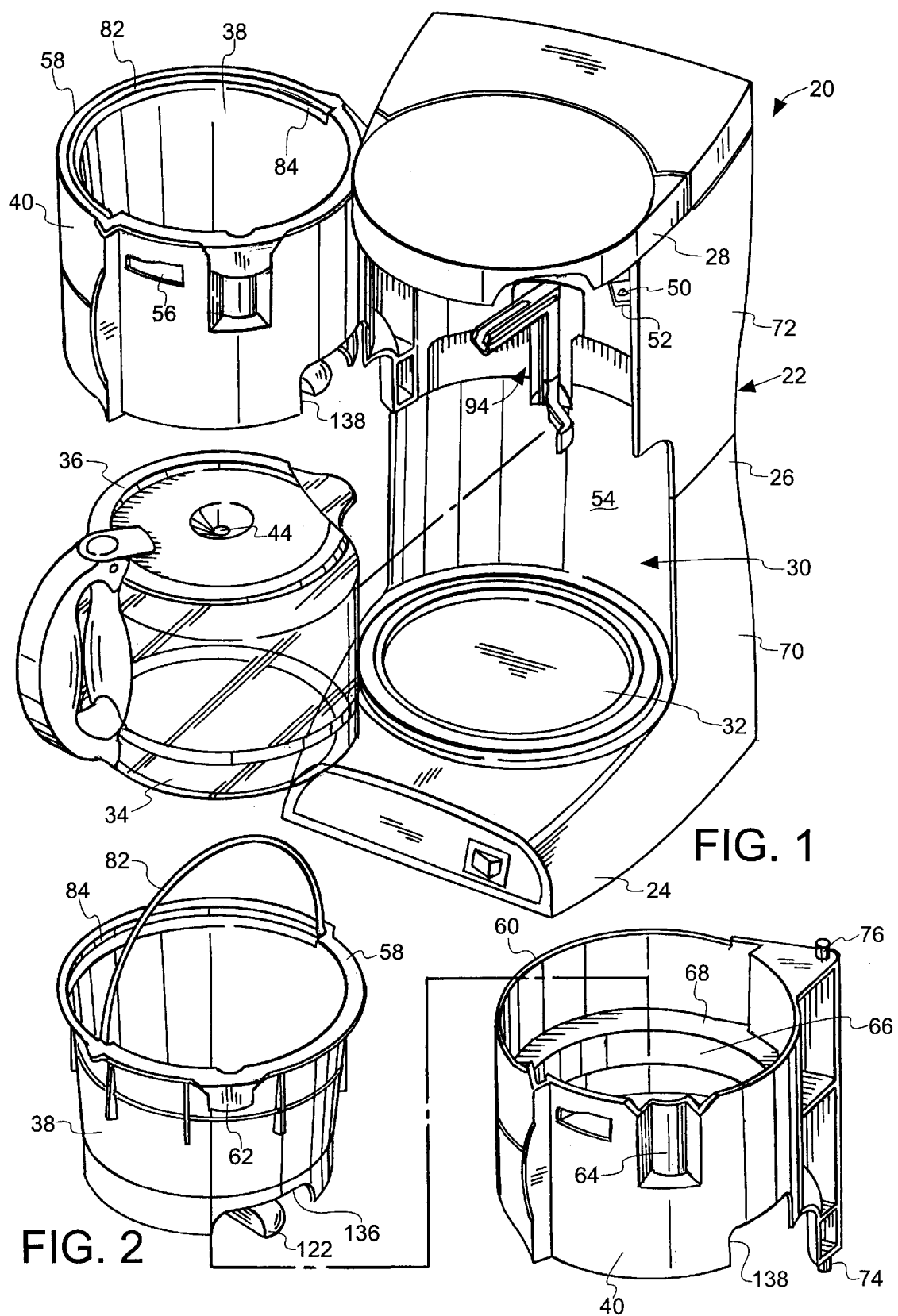

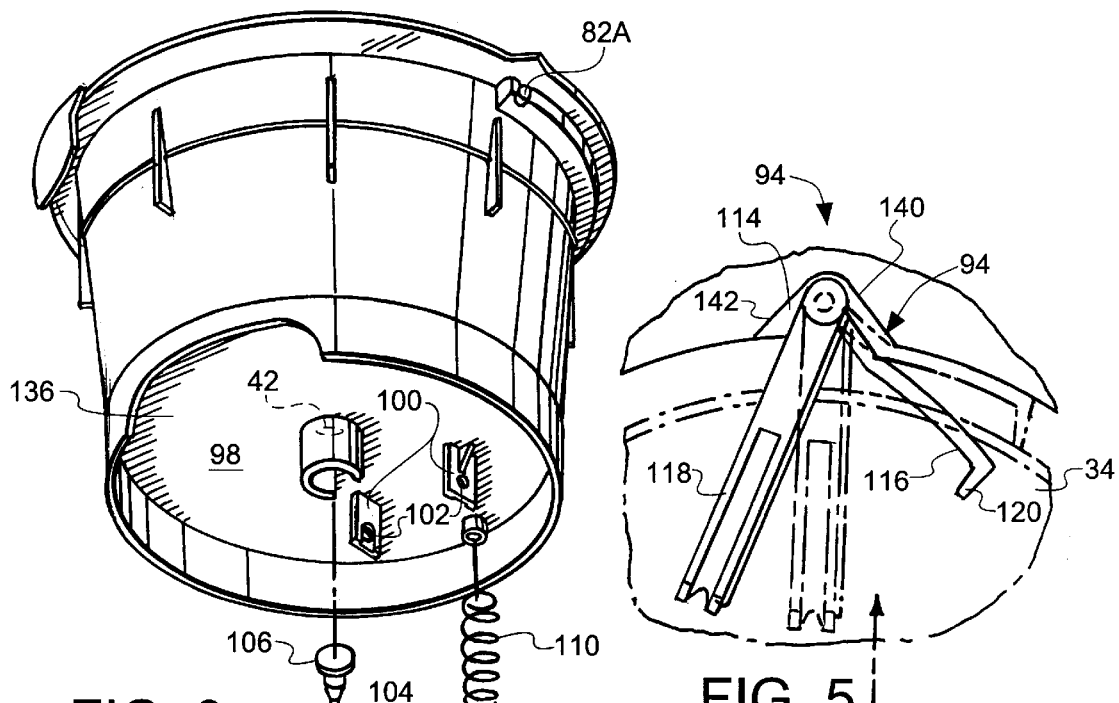
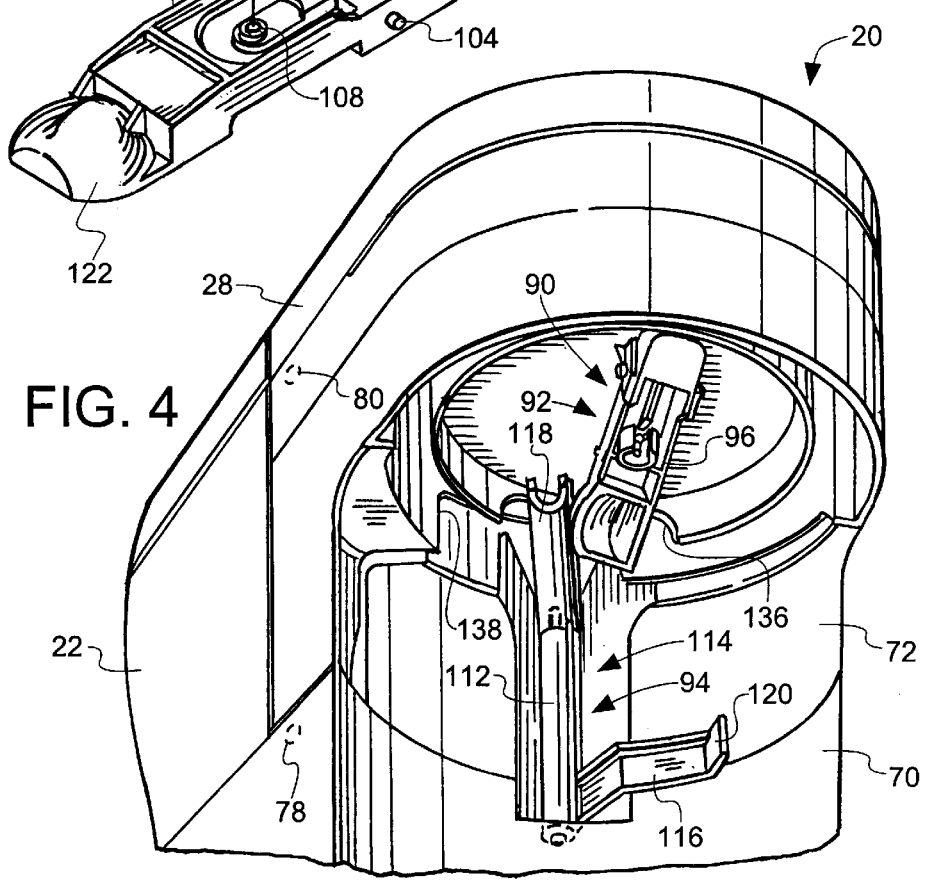

COFFEE MAKER WITH A PAUSE-SERVE MECHANISM

FIELD OF THE INVENTION

The present invention relates to a coffee maker with a pause-serve mechanism. The pause-serve mechanism of this invention is primarily intended for use with automatic drip coffee makers having removable brew baskets but may be used with other types of coffee makers. In addition, this invention may also be useful for brewing other beverages, such as tea.

Incorporation by Reference

The entire disclosure of U.S. Pat. No. 4,328,740 is hereby incorporated by reference herein.

BACKGROUND OF THE INVENTION

Pause-serve mechanisms are designed to enable a user to temporarily remove a carafe from underneath a brew basket of a coffee maker during a brewing cycle without having freshly brewed coffee drip or flow out of the brew basket outlet. Such mechanisms typically include a spring-biased valve for closing the outlet orifice of the brew basket when the carafe is removed from the coffee maker. The spring bias acting on the valve is overcome when the carafe is inserted into its brew-receiving position.

Ideally, a pause-serve mechanism is reliable, inexpensive and durable, and is constructed to create minimal interference with the operation or use of the coffee maker. Although many different pause-serve mechanisms have been developed, there is still a continuing need to reduce the cost and increase the durability of pause-serve mechanisms, and a need to improve their operating characteristics.

SUMMARY OF THE INVENTION

An object of this invention is to provide a coffee maker having an improved pause-serve mechanism, and particularly a pause-serve mechanism which is reliable, inexpensive and durable.

Another object of this invention is to provide a coffee maker having a pause-serve mechanism which does not significantly interfere with the operation or use of the coffee maker.

A coffee maker in accordance with this invention includes a housing having a base for supporting a carafe, an upright stanchion, and a head supported by the stanchion. A brew basket having an outlet for delivering brewed coffee to the carafe is supported by the head of the housing over a carafe supported on the base. A valve element for opening and closing the brew basket outlet is mounted on a spring-biased valve lever that is pivotally mounted on the bottom of the brew basket for movement between a first, valve-closed position and a second, valve-opened position. For moving the valve lever into a position effective to open the brew basket outlet when a carafe is located in the carafe-receiving compartment, a valve actuator is provided which includes a vertically-oriented shaft mounted on the pedestal for rotation about a vertical axis, a lower arm fixed to the vertical shaft for engagement by a carafe positioned in the compartment, and an upper arm fixed to the vertical shaft for engagement with the rearward end of the valve lever. The rearward end of the valve lever and the upper arm have mutually engageable surfaces that, when engaged, cause the valve lever to be pivoted to its second position to open the brew basket outlet.

Other objects and advantages of this invention will become apparent from the following description and accompanying drawings.

BRIEF DESCRIPTION OF THE DRAWINGS

FIG. 1 is a partly exploded, perspective view as seen from the top, front, and right side of an automatic drip coffee maker that embodies the present invention.

FIG. 2 is an exploded perspective view of-the brew basket holder and the brew basket of FIG. 1 as seen generally from the top and rear thereof.

FIG. 3 is an exploded perspective view of the brew basket and a valve assembly that forms part of the pause-serve mechanism of this invention and that is mounted on the bottom of the brew basket.

FIG. 4 is a fragmentary perspective view of the coffee maker housing, filter basket, filter basket holder, and the pause-serve mechanism of FIG. 1, as seen from the front, bottom, and left side of the coffee maker.

FIG. 5 is a simplified, diagrammatic, fragmentary plan view showing a typical range of motion of the pause-serve actuator, and also showing a portion of the carafe by broken lines.

DETAILED DESCRIPTION

Figure 6:
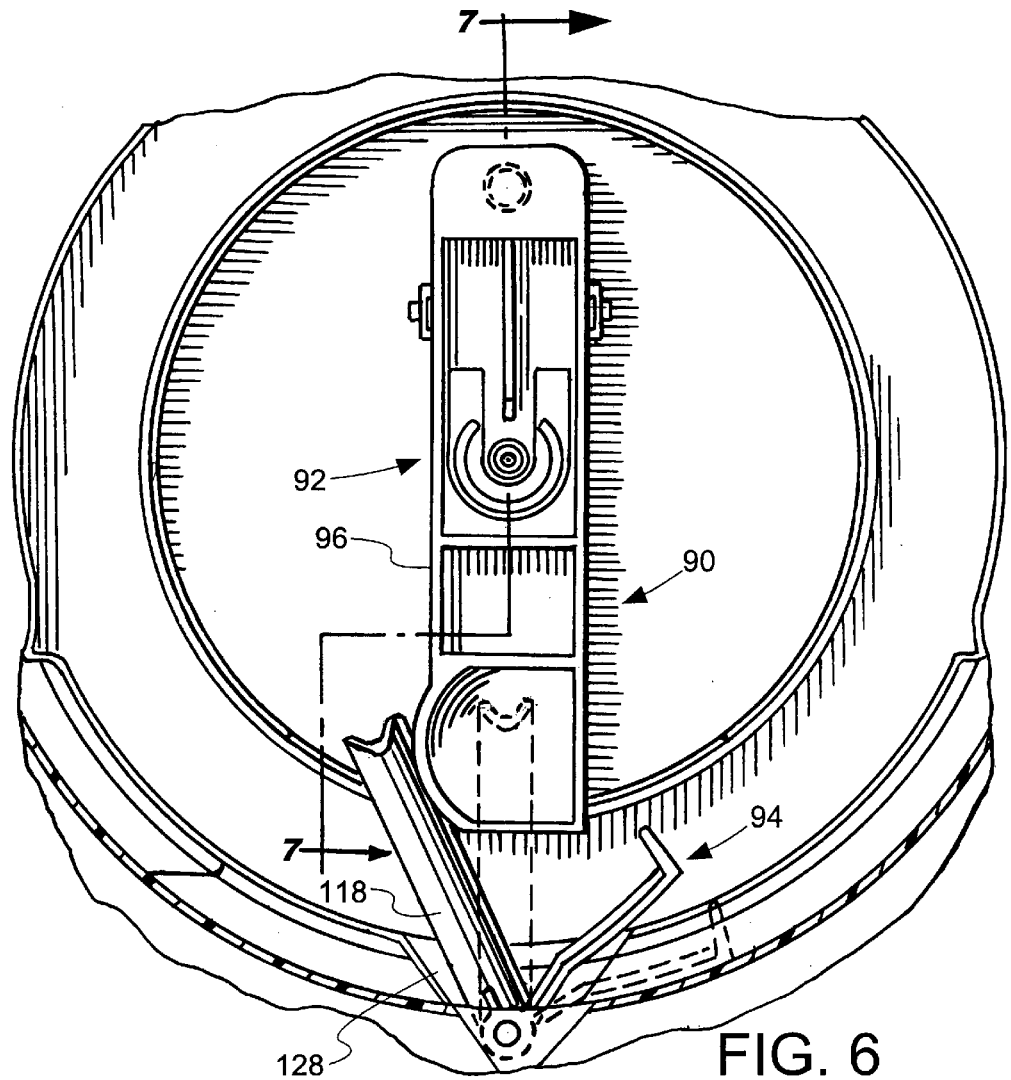
FIG. 6 is a fragmentary, bottom plan view, with parts in cross section, of the coffee maker housing, filter basket, filter basket holder, and the pause-serve mechanism of FIG. 1.

FIG. 1 shows an automatic drip coffee maker, generally designated 20, in accordance with this invention, which includes a housing, generally designated 22, having a base 24, an upright pedestal 26, and a head 28 supported by the pedestal 26. The base 24, pedestal 26 and head 28 define a carafe-receiving compartment 30 in the front of the coffee maker 20. In the embodiment shown in the drawings, the base 24 supports a warming plate 32 on which a carafe 34 having a lid 36 is placed when the coffee maker 20 is in operation.

Figure 7:
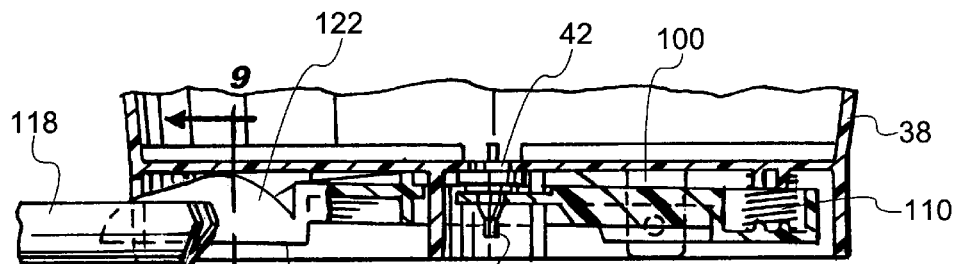
FIG. 7 is a fragmentary cross-sectional view taken along lines 7—7 of FIG. 6 showing parts of the filter basket and parts of the pause-serve mechanism when the brewed liquid outlet is closed by the valve.
Figure 8:
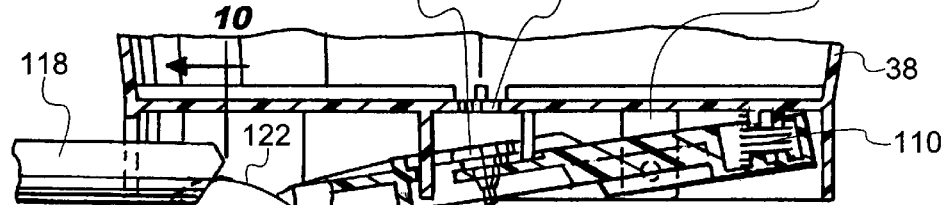
FIG. 8 is a fragmentary cross-sectional view similar to FIG. 7 but showing the parts when the brewed liquid outlet is open.
Figure 9:
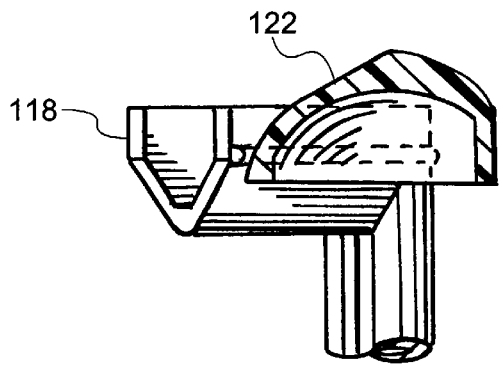
FIG. 9 is a cross-sectional view of the valve lever, taken along line 9—9 of FIG. 7, and a fragmentary perspective view of an upper arm of the valve actuator and illustrating the relationship between them shown in side elevation in FIG. 7.
Figure 10:
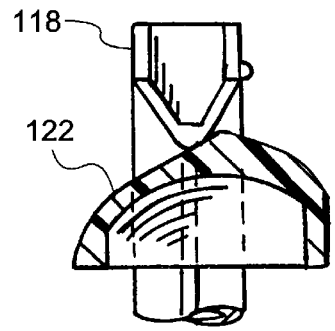
FIG. 10 is a cross-sectional view similar to FIG. 9 but taken along line 10—10 of FIG. 8 and illustrating the relationship shown in side elevation in FIG. 8 between the valve lever and the upper arm of the valve actuator.

A filter or brew basket 38 for holding a paper or the like filter (not shown) partly filled with coffee grounds or other flavoring particulates (not shown) is supported under the head 28 and over the warmer plate 32 and the carafe 34 by a brew basket holder 40 pivotally mounted on one side of the housing 22. The brew basket 38 has a brewed liquid outlet 42 (FIGS. 7 and 8) through which brewed coffee or the like can flow downwardly into the carafe 34 through an aperture 44 in the carafe lid 36. The pivotal mounting of the basket holder 40 enables the brew basket 38 to be positioned in an operative position with its outlet 42 aligned with the carafe lid aperture 44. With reference to FIG. 1, a latching protuberance 50 extending upwardly from a small plate 52 mounted on the front wall, designated 54, of the housing 22 interfits with the upper edge of a latch opening 56 in the wall of the brew basket holder 40 to frictionally restrain the brew basket holder 40 from accidentally pivoting out of its operative position. The pivotal mounting of the basket holder 40 also enables the holder 40 to be pivoted to the side of the pedestal 26, as shown in FIG. 1, to enable removal of the brew basket 38 for disposal of the filter paper or the like and the coffee grounds or other flavoring particulates.

With reference to FIG. 2, the filter or brew basket 38 has an upper rim 58 which is supported by the upper edge 60 of the brew basket holder 40. Interfitting surfaces of the brew basket 38 and the holder 40, and particularly a tab 62 extending downwardly from the brew basket rim 58 into a recessed pocket 64 in the brew basket holder 40, properly orient the brew basket 38 about its vertical axis relative to the housing 22. A truncated conical flange 66 extending downwardly from an annular shoulder 68 inside the brew basket holder 40 prevents the brew basket 38 from moving laterally relative to the holder 40 in any direction to any significant degree.

With reference to FIGS. 1 and 4, it will be noted that the housing 22 comprises a lower or deck housing member 70 and an upper or reservoir housing member 72. Pivotal mounting of the filter holder 40 is provided by means of a pair of mutually-aligned pivot pins 74 and 76 (FIG. 2), the lower pin 74 being received within an aperture 78 (shown in phantom in FIG. 4) in the top of the lower housing member 70 and the upper pin 76 being received within another aperture 80 (also shown in phantom in FIG. 4) located in the bottom of the head 28.

As shown in FIGS. 1 and 2, the brew basket 38 preferably has a handle in the form of a bail 82 with end portions 82A (FIG. 3) located within mutually-opposed apertures in the outer wall of the basket 38 so that the bail 82 can be pivoted to an upright orientation, as shown in FIG. 2, and to a lowered position, as shown in FIG. 1, in which it is located in an arcuate recess 84 in the top of the brew basket 38 and beneath the top rim of the basket 38.

Referring now to FIGS. 3, 4 and 6, the pause-serve mechanism, generally designated 90, of this invention comprises a valve assembly, generally designated 92, and a valve actuator, generally designated 94. The valve assembly 92 comprises an elongate valve lever 96 that extends diametrically across the bottom wall, designated 98, of the brew basket 38 and is pivotally supported in depending relation thereto by a pair of support plates 100 having pivot apertures 102 which rotatably receive pivot pins 104 that project from the opposite side edges of the valve lever 96. The support plates 100 are located generally between the outlet 42 and the forward portion of the brew basket 38. A silicone valve member or stopper 106 is frictionally held in a mounting hole 108 located centrally of the valve lever 96. A compression spring 110 trapped between the forward end of the valve lever 96 and the bottom wall 98 of the brew basket 38 biases the forward end of the valve lever 96 downwardly so that the stopper 106 closes the outlet 42. To open the outlet 42 and permit the brewed liquid in the brew basket 38 to flow into the carafe 34, the rearward end of the valve lever 96 is pressed downwardly against the bias of the spring 110. This is accomplished by the operation of the valve actuator 94 as discussed below.

With reference to FIGS. 1 and 4 through 14, the valve actuator 94 comprises a vertically oriented shaft 112 mounted for rotation about its axis in a recess 114 located centrally between the sides of the front wall 54 of the housing pedestal 26. The actuator 94 also comprises a pair of horizontal arms, namely a lower, carafe-engaging, arm 116 and an upper, valve actuating, arm 118, integrally fixed to and projecting from the vertical shaft 112. A pad 120 at the free end of the lower arm 116 is adapted to be engaged by the body of the carafe 34 as it is being placed on the warmer plate 32, as indicated by the arrow in FIG. 5. Engagement of the pad 120 by the body of the carafe 34 causes the valve actuator 94 to be rotated in a counterclockwise direction, as viewed from the top of the coffee maker 20, into the position thereof shown by phantom lines in FIGS. 5 and 6. Such movement of the valve actuator 94 causes the upper horizontal arm 118 to engage the rearward upper surface, designated 122, of the valve lever 96 and, due to a camming action, press downwardly on the rearward end of the valve lever 96, causing the valve lever 96 to pivot to cause the valve stopper 106 to move away from the outlet 42. Brewed liquid can then flow from the brew basket 38 into the carafe 34. The aforementioned camming action obtains because, as shown best in FIGS. 9 and 10, the upper surface 122 at the rearward end of the valve lever 96 is curved convexly upwardly and the upper, valve actuating, arm 118 has sloping sides and a lower surface that extends convexly downwardly. The movements of the valve lever 96 to open and close the outlet 42 are readily apparent from a comparison of FIGS. 7 and 9 with FIGS. 8 and 10. When the carafe 34 is removed from the warmer plate 32, the spring 110 causes the rearward end of the valve lever 96 to move upwardly, which in turn causes the upper actuator arm 118 to slide out of engagement with the valve lever 96.

It will be noted that the lower, carafe-engaging, arm 116 is angularly-spaced from the upper arm 118 and the actuator 94 is so confined by the sides of the recess 114 such that the free end of the lower arm 116 always extends to the right of center of the pedestal 26, as viewed from the front of the housing 22, and the free end of the upper arm 118 always extends to the left of center of the pedestal 26. Accordingly, the free ends of neither arm 116 or 118 can arrive at or past a center position. Therefore, the lower arm 116 is never located in a position in which it could interfere with the placement of the carafe 34 on the warmer plate 32. Also, the upper arm 118 is never located in a position in which it can hang up on the valve lever 96.

Figure 11:
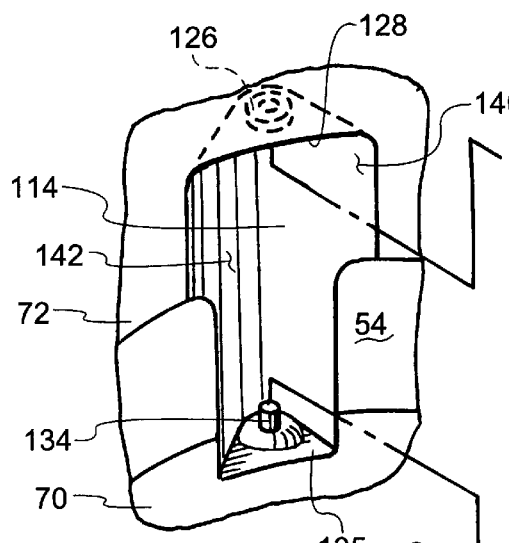
FIG. 11 is an exploded perspective view of a portion of the front wall of the housing and the valve actuator.
Figure 12:
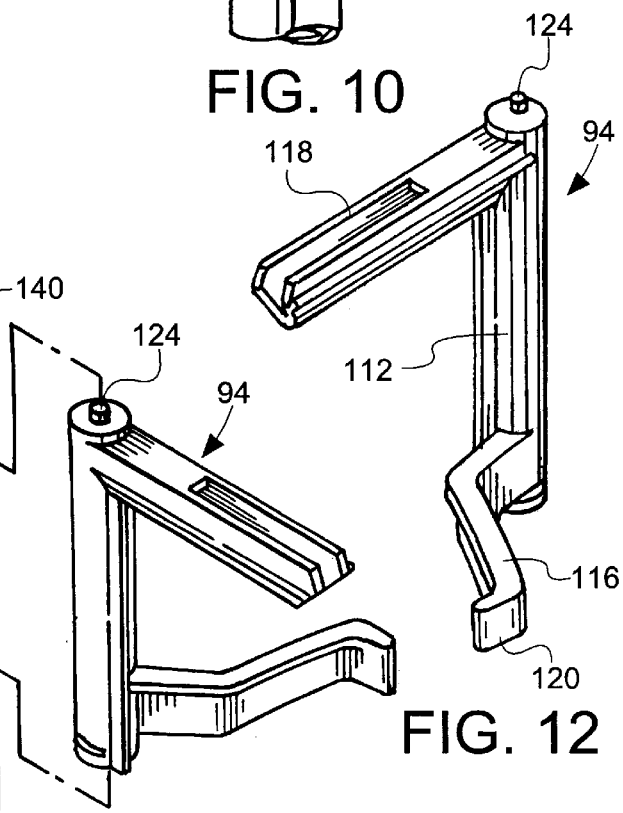
FIG. 12 is a perspective view of the valve actuator as viewed from the top and one side.
Figure 13:
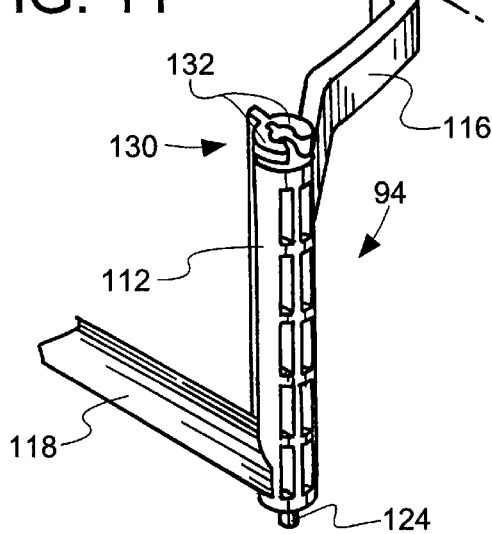
FIG. 13 is a perspective view of the valve actuator as viewed from the bottom and one side.

FIGS. 11, 12 and 13 show the valve actuator 94 in greater detail. The actuator 94 is preferably molded in one piece from a suitable plastic, such as polypropylene, and includes an upstanding pivot pin 124 at the top of the vertical shaft 112 which fits within a hollow cylindrical socket 126 in the top wall, designated 128, of the recess 114. As shown best in FIG. 13, a C-shaped split ring 130 is formed by a pair of mutually-confronting resilient fingers 132 at the bottom of the vertical shaft 112. The ring 130 partly encircles a stub shaft 134 that projects upwardly from the bottom wall, designated 135, of the recess 114. It will be noted that the top wall 128 of the recess 114 is located in the upper housing member 72 whereas the bottom wall 135 of the recess 114 is located in the lower housing member 70. The actuator 94 can easily be assembled into the recess 114 after the upper and lower housing parts 70 and 72 have been assembled by inserting the pivot pin 124 into the upper wall socket 126 and then pressing the bottom of the vertical shaft 112 into the recess 114 whereupon the fingers 132 resiliently spread apart to permit the stub shaft 134 to enter into the open center of the ring 130.

Figure 14:
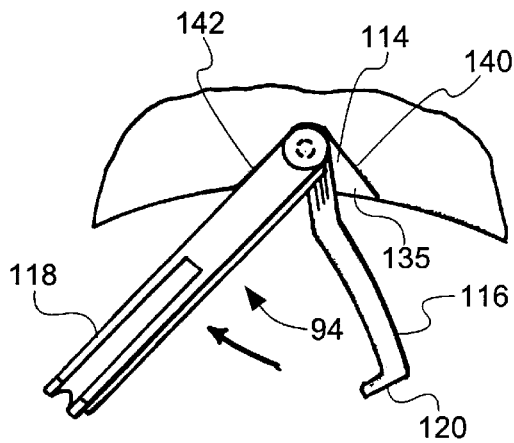
FIG. 14 is a simplified, diagrammatic, fragmentary plan view similar to FIG. 5 but showing the valve actuator stopped against the wall of a recess in the front wall of the coffee maker.

With reference to FIGS. 2 and 4, an open window 136 is formed along the rearward edge of the lower end of the brew basket 38 and a similar open window 138 is formed along the rearward edge of the lower end of the brew basket holder 40. Windows 136 and 138, which are mutually aligned, are provided to enable engagement of the upper arm 118 of the actuator 94 with the rearward end of the valve lever 96. With reference to FIGS. 5, 11 and 14, the recess 114 has forwardly and outwardly sloping sidewalls 140 and 142 which limit the angle through which the valve actuator 94 can rotate. Accordingly, the valve actuator 94 can never be positioned to interfere with movements of the carafe 34 or movements of the basket 38 and its holder 40. Because the extreme clockwise (as viewed from above) position of the actuator 94 shown in FIG. 14 is limited by the engagement of the upper arm 118 with the recess sidewall 142, it is assured that the upper arm 118 will always be located within the range of the windows 136 and 138.

As will be apparent by this time, the pause-serve mechanism 90 functions to cause the brew basket outlet 42 to be closed by the spring biased valve lever 96 and the valve stopper 106 carried thereby whenever the filter or brew basket 38 is removed from its operative positioned and also whenever the carafe 34 is not fully positioned on the warmer plate 32. Accordingly, one may simply remove the carafe 34 from the warmer plate 32 to pour coffee into a container during a brewing cycle without concern that the outlet 42 will be open and then replace the carafe 34 on the warmer plate 32 to open the outlet 42. One may also pivot the brew basket holder 40 to the side of the housing 22 without concern that brewed liquid will drip from the brewed liquid outlet 42.

It will be readily understood that the pause-serve mechanism of this invention may be used with brew baskets supported by means other than those disclosed herein such, for example, as slidably mounted brew baskets.

Although the presently preferred embodiment of this invention has been described, it will be understood that within the purview of the invention various changes may be made within the scope of the following claims.

Having thus described our invention, we claim:

1. A coffee maker having a pause-serve mechanism comprising:

a housing having a base for supporting a carafe, an upright pedestal, and a head supported by the pedestal;

a brew basket supported by the head over a carafe supported on the base, said brew basket having an outlet through which brewed coffee can flow downwardly into the carafe;

a valve lever pivotally mounted on the bottom of the brew basket having a forward end and a rearward end;

a valve element mounted on said valve lever intermediate said forward end and said rearward end and operative to open and close said outlet;

a spring that biases said forward end of said valve lever downwardly into a position in which said valve element closes said outlet;

and a valve actuator for moving said valve lever into a position effective to open said outlet when a carafe is located on said base, said valve actuator comprising a vertically-oriented shaft pivotally mounted on said pedestal for rotation about a vertical axis, a lower arm fixed to said shaft for engagement by a carafe positioned on said base, and an upper arm fixed to said shaft that presses said rearward end of said valve lever downwardly to move said valve element to open said outlet in response to the carafe being positioned on said base.

2. The coffee maker of claim 1 wherein said valve actuator is plastic and molded in one piece.

3. The coffee maker of claim 2 wherein said upper arm and said lower arm are both horizontal.

4. The coffee maker of claim 2 wherein said pedestal has a front wall provided with a recess which receives said vertical shaft of said valve actuator, said recess having marginal portions which restrict the angle through which said valve actuator can pivot.

5. The coffee maker of claim 4 wherein said recess has an upper wall and a lower wall, said upper and lower walls and said vertical shaft having respective pairs of mutually engaging, relatively rotatable pivot members.

6. The coffee maker of claim 5 wherein one of said pairs of pivot members comprises a vertical stub shaft extending from one of said upper and lower walls and a split ring comprising a pair of resilient fingers on one end of said vertical shaft that rotatably receives said stub shaft.

7. The coffee maker of claim 6 wherein the other of said pairs of pivot members comprises a pin located at the opposite end of said vertical shaft and a socket integrally formed on the other of said upper and lower walls.

8. The coffee maker of claim 1 wherein said upper arm has a sloping surface for engagement with said rearward end of said valve lever, and wherein said rearward end of said valve lever has an arcuate upper surface engaged by said sloping surface of said upper arm so that said upper arm readily slides out of engagement with said valve lever in response to removal of a carafe from said compartment.

* * * * *